United States Patent [19]

Jacob et al.

[11] 4,347,603

[45] Aug. 31, 1982

[54] SYSTEM FOR EXCHANGING ENCODED MESSAGES BETWEEN STATIONS

[75] Inventors: Jean-Baptiste Jacob; Yves Mathieu, both of Perros-Guirec; Michel Ruvoen, Trebeurden, all of France

[73] Assignee: Compagnie Industrielle des Telecommunications Cit-Alcatel, Paris, France

[21] Appl. No.: 145,539

[22] Filed: May 1, 1980

[30] Foreign Application Priority Data

May 4, 1979 [FR] France ................................ 79 11319

[51] Int. Cl.³ ......................... H04J 3/08; H04L 1/16; H04L 1/10
[52] U.S. Cl. .................................. 370/85; 340/825.53; 370/15; 371/32; 371/49
[58] Field of Search ...................... 371/3, 6, 32, 49; 370/13, 15, 58, 60, 61, 77, 85; 340/825.53

[56] References Cited

U.S. PATENT DOCUMENTS

| | | | |
|---|---|---|---|
| 3,618,017 | 11/1971 | Murayama et al. | 371/32 |
| 3,714,377 | 1/1973 | Moretti | 370/61 |
| 3,914,741 | 10/1975 | Bonser et al. | 371/49 |
| 3,985,962 | 10/1976 | Jones et al. | 370/90 |
| 4,245,344 | 1/1981 | Richter | 371/49 |

FOREIGN PATENT DOCUMENTS 2342611 9/1977 France .

OTHER PUBLICATIONS

Proceedings of the IEEE, vol. 65, No. 9, Sep. 1977, N. Jovic et al., "Interprocessor communication in systems with distributed control", pp. 1323 à 1329.
International Zurich Seminar on Integrated Systems for Speech, Video and Data Communications, Mar. 15–17, 1972, P. G. Fontolliet, "Transmission of control information in IFS-1", pp. B5 (1) à B5 (4).
Internal Conference on Communications, vol. 2, Jun. 4–7, 1978, IEEE, New York (US), E. W. Anderson et al., "A microprocessor based controller for a loop switching system", pp. 24.4.1 à 24.4.6.

Primary Examiner—Benedict V. Safourek
Attorney, Agent, or Firm—Sughrue, Mion, Zinn, Macpeak & Seas

[57] ABSTRACT

The present invention consists in a system for exchanging encoded messages between stations, in which each station comprises a connection module (2) connected to a signal bus (LMS) and to a data bus (LMI), the signal and data buses being serial multiplex links synchronized by a general timebase, a time interval comprising consecutive even-numbered and odd-numbered time slots being allocated in each signalling frame to each connection module. In this system for exchanging encoded messages, the signal and data buses are duplicated for security reasons, signalling messages being sent simultaneously on both signal buses and data messages being sent simultaneously on both data buses, messages being received on one bus only.

9 Claims, 4 Drawing Figures 4,347,603

SYSTEM FOR EXCHANGING ENCODED MESSAGES BETWEEN STATIONS

FIELD OF THE INVENTION

The invention concerns the exchange of encoded messages between stations and particularly but not exclusively between control units of a time-division exchange.

BACKGROUND OF THE INVENTION

Systems are already known for exchanging encoded messages between stations operating in time-sharing mode. The stations may comprise computers, or data receiving and sending devices, or more generally data processing devices. In such message exchange systems, a message with priority higher than that of other messages takes precedence over such messages, requiring costly and complex switching arrangements.

Preferred embodiments of the present invention provide a system for exchanging encoded messages which is less complex than hitherto known systems.

SUMMARY OF THE INVENTION

The present invention consists in a system for exchanging encoded messages between stations, in which each station comprises a connection module connected to a signal bus and to a data bus, the signal and data buses being serial multiplex links synchronised by a general timebase, a time interval comprising consecutive even-numbered and odd-numbered time slots being allocated in each signalling frame to each connection module. In this system for exchanging encoded messages, the signal and data buses are duplicated for security reasons, signalling messages being sent simultaneously on both signal buses and data messages being sent simultaneously on both data buses, messages being received on one bus only.

In this system for exchanging encoded messages faults are detected quickly without loss of messages. The status of each connection module is transmitted in each frame, in the allocated time interval, each connection module storing the status of each other module allowing time to be saved in exchanging messages if one of the connection modules is not in service.

More precisely the present invention provides a system for exchanging encoded messages between stations connected by a signal bus and a data bus, each station being connected to a general timebase and including a connection module connected to the data bus and to the signal bus, wherein the signal bus and data bus are serial multiplex links synchronous with the timebase, a time interval comprising consecutive even-numbered and odd-numbered time slots being allocated in each signalling frame to each connection module, and wherein each connection module comprises:

means for calling a station by sending a number relating to the called station in its time interval,
means for receiving a response from the called station during its time interval and authorising the sending of a data message,
means for sending a response upon receipt of a number sent from a calling station in its time interval,
means for storing a data message and sending said message in a data bus frame,
means for receiving a data message,
means for computing the parity of the sent message and sending a parity bit at the end of the message and storing the message, and
means for computing the parity of the received data message and sending the result of the computation in the data frame following the message.

The invention will now be described in more detail with reference to a specific embodiment thereof shown in the accompanying drawings.

DESCRIPTION OF THE PREFERRED EMBODIMENT

Figure 1:
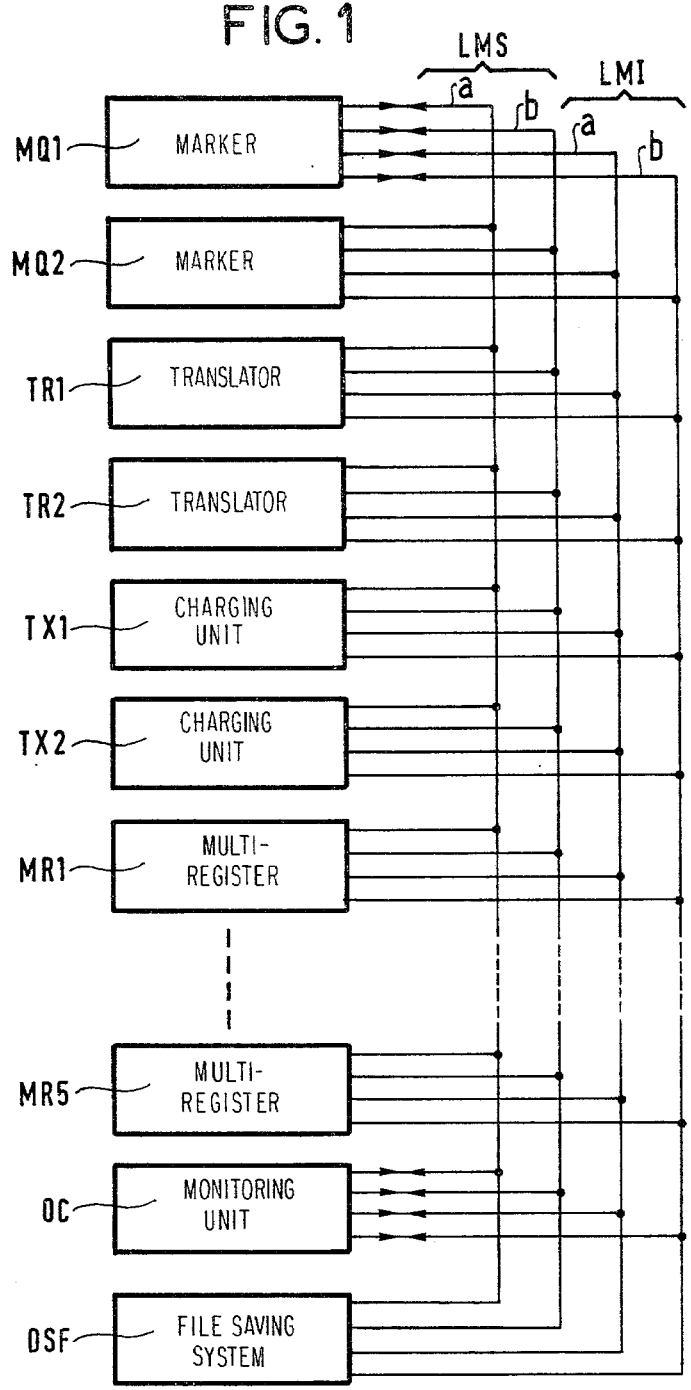
FIG. 1 is a block schematic diagram of a system in accordance with the invention.

Referring to FIG. 1, the system comprises markers MQ1 and MQ2, translators TR1 and TR2, charging units TX1 and TX2, multiregisters MR1 to MR5, a monitoring unit OC connected to an operations and maintenance centre, and a file saving system DSF. All stations are interconnected by signal links LMSa and LMSb and data links LMIa and LMIb. All links are two-way. The signal and data links are duplicated for reasons of security.

Each station is of conventional type and incorporates a connection module including a send amplifier and a receive amplifier on each signal and data link. Each link is organised as a two-way bus and enables each station to dialogue with any other station connected to the bus. Each bus is a serial multiplex link synchronised by a general timebase.

These links connect the monitoring unit OC to the other stations, each of which comprises a connection module and a control unit, marker, charging unit, translator, multiregister, file saving system or monitoring unit.

Figure 2:
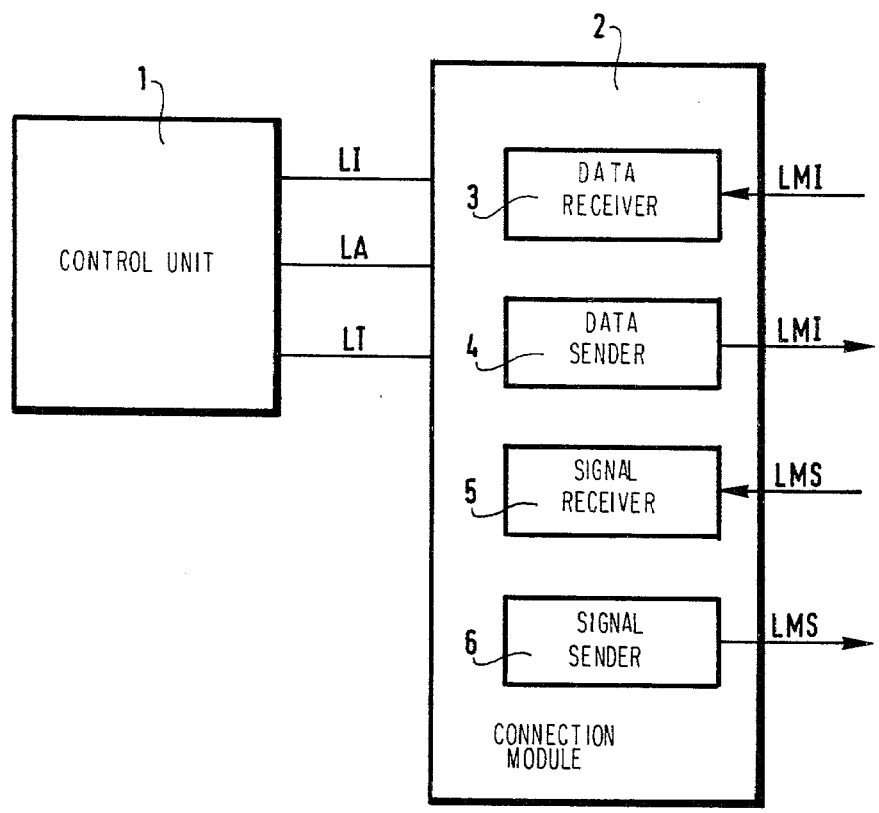
FIG. 2 is a block schematic diagram of one station of FIG. 1.

FIG. 2 is a block schematic of one station of FIG. 1. The station comprises a control unit 1 implementing the function of the station (marker, charging unit, etc.) and a connection module 2 to which it is connected by an internal data bus LI, a test signal bus LT and an address bus LA.

The connection module comprises:
a data receiver 3 connected to the data bus LMI comprising data links LMIa to LMIb,
a data sender 4 connected to the data bus LMI comprising data links LMIa and LMIb,
a signal receiver 5 connected to the signal bus LMS comprising signal links LMSa and LMSb, and
a signal sender 6 connected to the signal bus LMS comprising signal links LMSa and LMSb.

Receivers 3 and 5 each comprise two amplifiers, one for each of the links constituting a bus. Likewise, senders 4 and 6 each comprise two amplifiers, one for each of the links constituting a bus.

Both links constituting a bus are used for transmission purposes. Only one link of a bus is used for reception, however, switchover occurring in response to detection of a parity error. Switching is controlled by the control unit 1 associated with the connection module 2.

Figure 3:
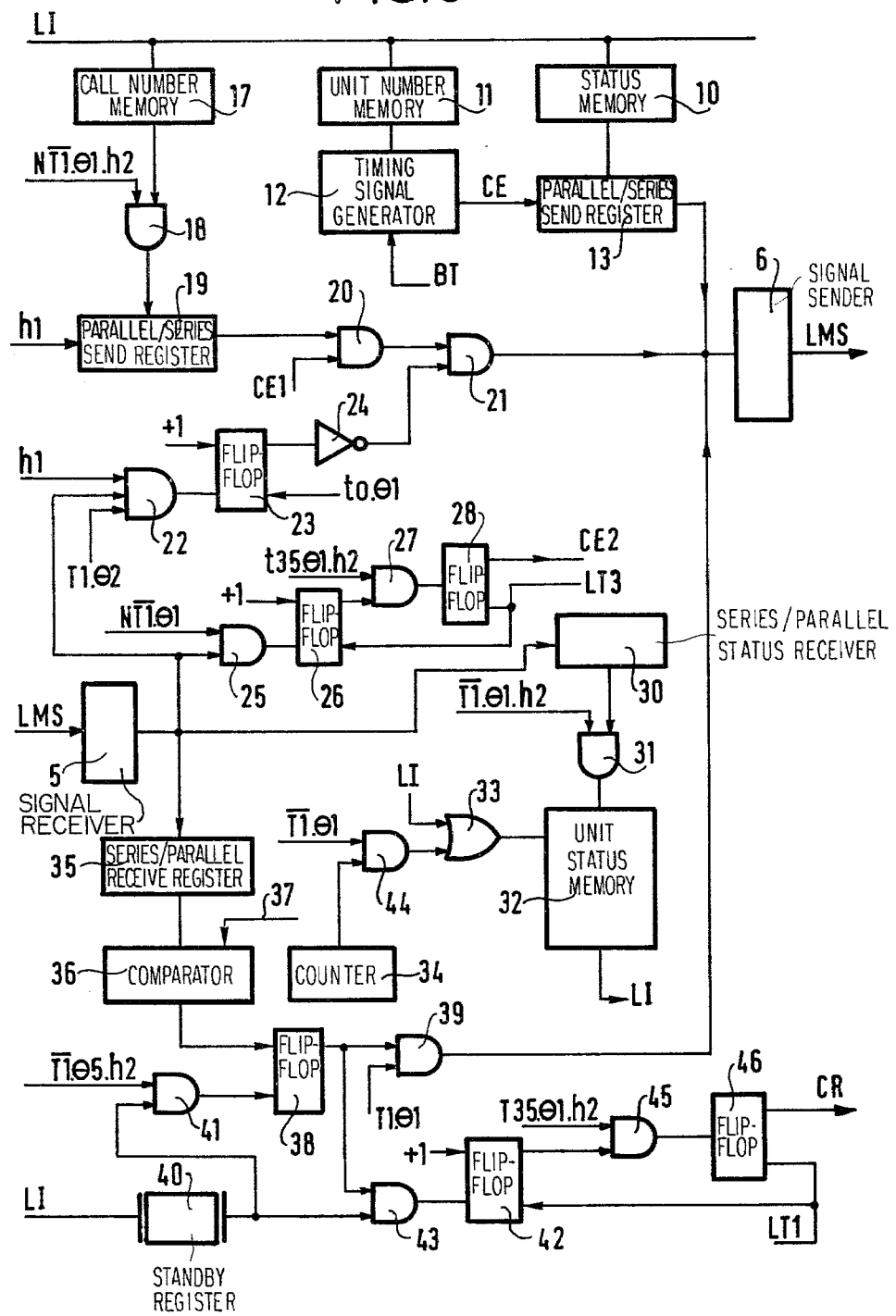
FIGS. 3 and 4 are schematic circuit diagrams which show the signalling part and data part respectively of the connection module of FIG. 2.
Figure 4:
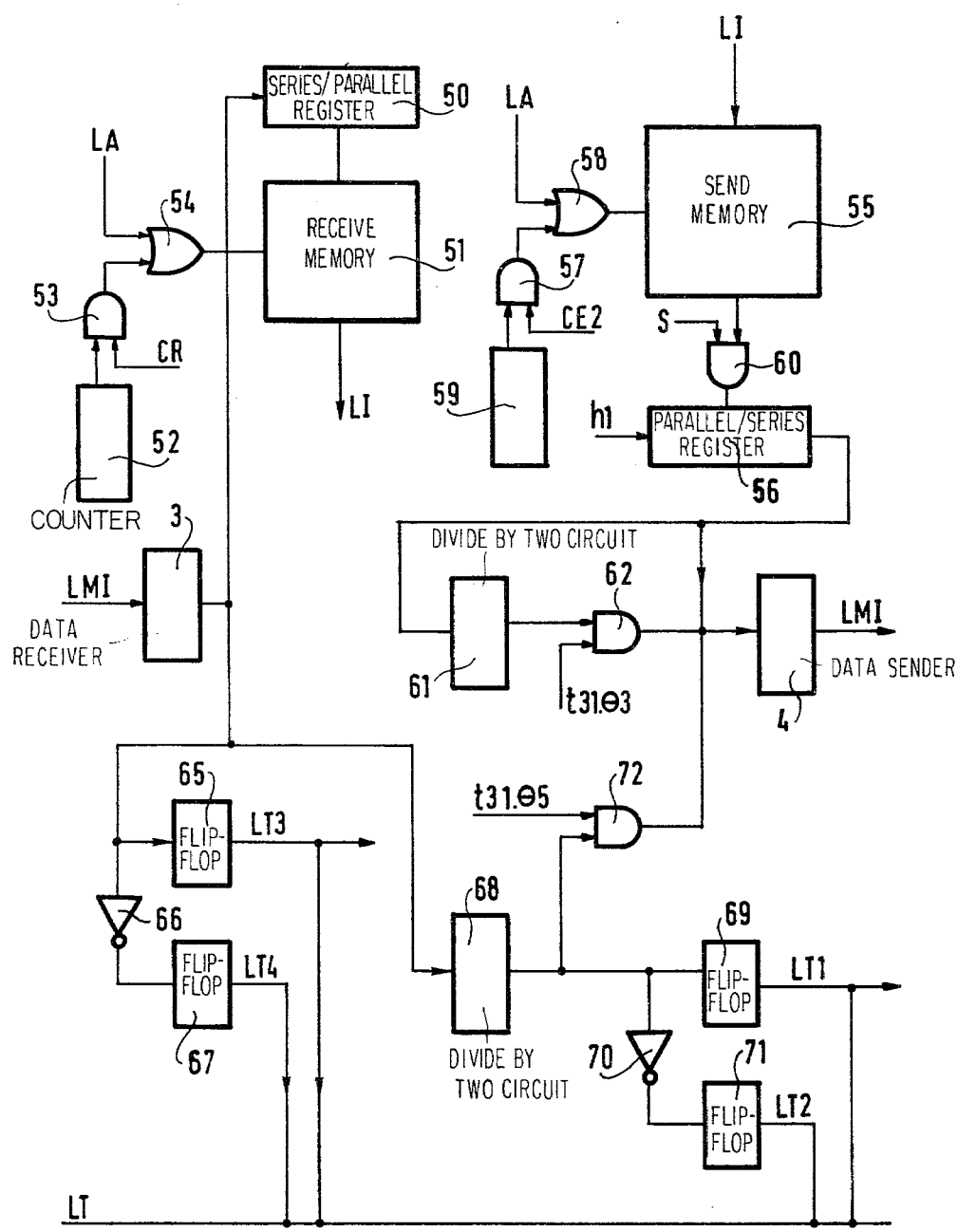

The connection module 2 has a data part associated with data bus LMI and a signalling part associated with signal bus LMS. FIG. 3 shows this signal part and FIG. 4 shows this data part of a connection module.

Referring to FIG. 3, the signal receiver 5 and signal sender 6 are common to FIG. 2. A status memory 10 is connected to the internal data bus LI and receives from it the status of the control unit associated with the connection module. A unit number memory 11 comprises a parallel/parallel register connected to internal data bus LI and receiving from it the number n of the control unit. A timing signal generator 12 is connected to the output of unit number memory 11 and receives signals BT from a timebase of the associated control unit. The timing signal generator produces timing signals which are used in the connection module. Timing signal CE is input to a parallel/series send register 13 with its input connected to status memory 10 and its output connected to signal sender 6.

The signals used in the connection module are as follows:

ti: signal associated with a time slot, duration 3.9 microseconds, period 125 microseconds; there are 32 signals ti per frame;

$\theta1, \theta2, \theta3, \theta4, \theta5$: signals of 780 nanoseconds duration with a period of 3.9 microseconds, with a relative offset of 780 nanoseconds;

h1, h2: signals of 120 nanoseconds duration with a period of 780 nanoseconds, with a relative shift of 300 nanoseconds, T1: signal of 3.9 microseconds duration with a period of 7.8 microseconds.

Signal $\overline{T1}$ is in phase with the odd-numbered time slots t1, t3, ... t31, and thus has the value 1 for these time slots.

Signal T1 is the complement of signal $\overline{T1}$ and corresponds to the even-numbered time slots.

These signals are generated by the control unit timebase.

As will be described in detail below, each control unit is allocated an even-numbered time slot t2n and an odd-numbered time slot t(2n+1) in a frame, where n is the number of the control unit. Hereinafter NT1 will be used to designate the odd-numbered time slot and $\overline{NT1}$ to designate the even-numbered time slot for a given control unit.

Timing signal CE is provided during NT1, its duration being defined by signals $\theta2$, to $\theta5$ and $\theta4$. It is generated in each odd time slot allocated to the control unit.

A call number memory 17 is connected to internal data bus LI which provides the number of the called control unit. The memory 17 is a parallel/parallel register with its output connected to one input of an AND gate 18 receiving on another input the signal $\overline{NT1.\theta1.h2}$. The output of AND gate 18 is connected to the input of a parallel/series send register 19 controlled by signal h1. The output of send register 19 is connected to one input of an AND gate 20, another input of which receives signal CE1 which is a timing signal corresponding to the even time slot $\overline{NT1}$ reserved for the control unit, of duration $\theta1$ to $\theta5$.

The output of AND gate 20 is connected to one input of an AND gate 21, the output of which is connected to signal sender 6. An AND gate 22 receives signal h1 on one input and signal T1.$\theta2$ on another input. A third input is connected to signalling receiver 5. The output of AND gate 22 is connected to a control input of a flip-flop 23 which receives a signal +1 on another input and a reset signal to.$\theta1$. The output of flip-flop 23 is connected through an inverter 24 to another input of AND gate 21.

The signal receiver is connected to one input of an AND gate 25 which is enabled by signal NT1.$\theta1$. The output of AND gate 25 is connected to a control input of a flip-flop 26 receiving a 1 on another input.

The output of flip-flop 26 is connected to one input of an AND gate 27, another input of which receives signal t31.$\theta35$.h2. The output of AND gate 27 is connected to the input of a flip-flop 28 which outputs a send enable signal CE2 to the data part (FIG. 4). Flip-flops 26 and 28 are reset by a signal on link LT3 sent by an "end of exchange in receive mode" flip-flop shown in FIG. 4.

Signal receiver 5 is connected to a series/parallel status receiver register 30, the output of which is connected to one input of an AND gate 31, another input of which receives signal $\overline{T1.\theta1.h2}$. The output of AND gate 31 is connected to the input of a unit status memory 32 which stores the status of each control unit connected to data bus LM1 and signal bus LMS (FIG. 1). The output of the unit status memory is connected to internal data bus LI. The output of an OR gate 33 is connected to the addressing input of the unit status memory, one input being connected to internal data bus LI and another input being connected to a counter 34 through an AND gate 44, for cyclic memory addressing. AND gate 44 is enabled by signal $\overline{T1.\theta1}$.

The output of signal receiver 5 is also connected to a series/parallel receive register 35 which receives a call number sent by another control unit. The output of the receive register is connected to one input of a comparator 36, another input of which receives over link 37 the number of the control unit associated with the connection module. This number is hardwired. The output of the comparator is connected to one input of a flip-flop 38, the output of which is connected to one input of an AND gate 39 with its output connected to signal sender 6, AND gate 39 receiving on another input signal T1.$\theta1$. A standby register 40 has its input connected to internal data bus LI to receive a signal of value 0 when the control unit associated with the connection module is processing a message. The standby register output is connected to one input of an AND gate 41, another input of which receives signal $\overline{T1.\theta5.h2}$. The output of AND gate 41 is connected to a control input of flip-flop 38. The output of standby register 40 is also connected to one input of an AND gate 43, another input of which is connected to the output of flip-flop 38. The output of AND gate 43 is connected to a control input of a flip-flop 42, another input of which receives a signal +1.

The output of flip-flop 42 is connected to one input of AND gate 45 which receives signal t31.$\theta1$.h2 on another input. The output of AND gate 45 is connected to a flip-flop 46 which outputs a receive enable signal CR to the data part (FIG. 4). Flip-flops 42 and 46 are reset by a signal on link LT1 sent from an "end of exchange in receive mode" flip-flop shown in FIG. 4. The unit sets flip-flop 38 so as to obtain a response signal at the output of AND gate 39 when comparator 36 outputs a signal on a positive result of comparing the received number with the hardwired number. When flip-flop 38 outputs a signal, the output signal of standby register 40 provides the enabling signal CR.

FIG. 4 shows the data part of a connection module. Data receiver 3 and data sender 4 are common to FIG. 2. A series/parallel register 50 is connected to data receiver 3. Its output is connected to a receive memory 51 whose output is connected to data bus LI.

In write mode the receive memory is addressed by the control unit, over address bus LA and through an OR gate 54. In read mode addressing is cyclic, by a counter 52 through an AND gate 53 enabled by the receive enable signal CR from flip-flop 46 shown in FIG. 3. The output of AND gate 53 is connected to OR gate 54.

A send memory 55 has its input connected to internal data bus LI over which it receives a message. Addressing for writing the message is effected by the control unit over address bus LA through an OR gate 58. In read mode the send memory is addressed cyclically by a counter 59 through an AND gate 57 and OR gate 58. AND gate 57 is enabled by the send enable signal CE2 from flip-flop 28 shown in FIG. 3. The output of the send memory is connected to a parallel/series register 56 through an AND gate 60 which is enabled every 16 bits of the message frame (where the latter comprises words of 16 bits) by a signal S from timing signal generator 12 shown in FIG. 3, when the connection module 20 is authorised to send a message.

Register 56 is controlled by signal h1 and its output is connected to data sender 4 and to a divide by two circuit 61 with its output connected to an AND gate 62 enabled by signal t31.$\theta$3. The output of AND gate 62 is connected to data sender 4. The message to send comprises 157 bits, from to.$\theta$1 to t31.$\theta$32. It is sent directly to data sender 4 by register 56. Divide by two circuit 61 also receives the message and at the end of the message its output value is 0 or 1. This is transferred to the signal sender at t31.$\theta$3 and constitutes the odd parity bit.

Data receiver 3 is also connected to an "end of exchange in send mode" flip-flop 65 and through an inverter 66 to a "not received correct" flip-flop 67. These flip-flops are connected by respective links LT3 and LT4 to test signal bus LT.

Data receiver 3 is further connected to a divide by two circuit 68 whose output is connected to an AND gate 72 enabled by signal t31.$\theta$5, to an "end of exchange in receive mode" flip-flop 69, and through an inverter 70 to a "receive parity error" flip-flop 71. The output of AND gate 72 is connected to data sender 4 and produces a "received correct" signal at t31.$\theta$5. Flip-flops 69 and 71 are connected by respective links LT1 and LT2 to test signal bus LT.

The operation of a connection module as shown in FIGS. 3 and 4 will now be described.

Each control unit can send on signal bus LMS (links LMSa and LMSb) during a defined time interval. If n is the number of a control unit, the time interval reserved for that control unit consists of time slots t2n and t(2n+1) of the 125 microsecond frame subdivided to provide 32 time slots.

The control unit numbers are allocated in a defined order of priority. The time slots allocated to each control unit number are listed below:

| | | | |
|---|---|---|---|
| t0, | t1 | Not allocated | |
| t2, | t3 | Marker MQ1 | No 1 |
| t4, | t5 | Translator TR1 | No 2 |
| t6, | t7 | Charging unit TX1 | No 3 |
| t8, | t9 | Multiregister MR1 | No 4 |
| t10, | t11 | Multiregister MR3 | No 5 |
| t12, | t13 | Multiregister MR5 | No 6 |
| t14, | t15 | File saving system DSF | No 7 |
| t16, | t17 | Not allocated | |
| t18, | t19 | Marker MQ2 | No 9 |
| t20, | t21 | Translator TR2 | No 10 |
| t22, | t23 | Charging unit TX2 | No 11 |

-continued

| | | | |
|---|---|---|---|
| t24, | t25 | Multiregister MR2 | No 12 |
| t26, | t27 | Multiregister MR4 | No 13 |
| t28, | t29 | Not allocated | |
| t30, | t31 | Monitoring unit OC | No 15 |

The data sent by a control unit in time slots t2n and t(2n+1) reserved for it are as follows:

Time slot t2n
  $\theta$1 to $\theta$4: encoded address of called unit, sent by control unit n
  $\theta$5: bit specifying request or response to message Time slot t(2n+1)
  $\theta$1: call response bit sent by control unit n when called
  $\theta$2 to $\theta$4: encoded status of control unit n
  $\theta$5: exclusivity bit sent by control unit n to confirm exclusivity of a task (modification of memory fields in like units).

Each control unit sends its status in each frame in time interval $\theta$2 to $\theta$4 of the odd-numbered time slot reserved for it.

Each connection module receives all sent unit status indications and stores them in unit status memory 32 (FIG. 3) which is loaded at T1.$\theta$1.h2. This memory is addressed cyclically by counter 34.

The control unit status is one of six possible states, coded on three bits in t(2n+1) from $\theta$2 to $\theta$4. These six states are:

NES not in service: no interchanges possible, the control unit being out of service or in test mode
OPE operational: this is the normal operating condition with the unit in service, all interchanges being possible
RES restricted service: this code is sent by a control unit which is in service but which is busy to more than a predefined extent; it continues to execute tasks already in progress but cannot initialise new tasks, except under certain special conditions
INDO unavailable busy: the control unit continues to execute and terminate tasks in progress, but will not initialise new operations
INDL unavailable not busy: the control unit has terminated all current tasks but cannot accept new tasks
INIT initialisation in progress: the control unit in service is copying from the like control unit.

The control unit status indications are encoded as follows in time slot t(2n+1):

| $\theta$2 | $\theta$3 | $\theta$4 | ETAT |
|---|---|---|---|
| 0 | 0 | 0 | NES |
| 0 | 0 | 1 | OPE |
| 0 | 1 | 0 | RES |
| 0 | 1 | 1 | INDO |
| 1 | 0 | 0 | INDL |
| 1 | 0 | 1 | INIT |

Messages are sent on data bus LMI (links LMIa and LMIb) in a frame which is in phase with the frames of signal bus LMS. The message begins at to.$f$4 and ends at t31.$\theta$2. This provides a data field at 157 bits, representing nine words of 16 bits plus one word of 13 bits. The parity bit is computed on transmission so that the number of bits at 1 in the message, including the parity bit, is odd. This bit is sent at t31.$\theta$3. If the parity check on reception gives a correct result the receiving control unit sends to the sending control unit over data bus LMI a "received correct" code:

t31.θ4=0 and t31.θ5=1.

Interchange procedure:

Signals are sent on signal links LMSa and LMSb. Signals are received on signal link LMSa or LMSb. Data is sent on data links LMIa and LMIb. Data is received on data links LMIa or LMIb.

Message interchange in send mode is monitored by the control unit which receives information from "end of exchange in send mode" flip-flop 65 and "not received correct" flip-flop 67 of FIG. 4. According to the states of these flip-flops, the sending control unit knows whether the message was sent correctly or not:

flip-flop 65=0, flip-flop 67=0: no response from control unit;
flip-flop 65=1, flip-flop 67=0: called control unit response "interchange correct";
flip-flop 65=0, flip-flop 67=1: called control unit response "interchange incorrect".

The principle of the check executed on reception is the same as that for transmission. According to the states of "end of exchange in receive mode" flip-flop 69 and "receive parity error 38 flip-flop 71 (FIG. 4), the called control unit knows whether the message was received correctly or not:

flip-flop 69=0, flip-flop 71=0: no message received;
flip-flop 69=1, flip-flop 71=0: message received correctly;
flip-flop 69=0, flip-flop 71=1: message received incorrectly.

From t2n.θ1 to t2n.θ4 the calling control unit n sends the encoded number of the called control unit over signal bus LMS, followed at t2n.θ5 by the message type bit: "request" or "response", provided that the signal bus is available. To this end, the sending control unit AND gate 21 (FIG. 3) is disabled if a response bit was sent by a control unit at time t1.θ1 prior to time $\overline{NT1}$ of the calling control unit, $\overline{NT1}$ designating the even-numbered time-slot t2n allocated to the calling control unit.

If the called control unit is on standby, when it recognises its number (comparator 36, FIG. 3) it immediately sends a response bit in its odd-numbered time slot NT1, at θ1.

When it detects this response bit, the sending control unit sends its message over data bus LMI, in the next frame, adding the computed odd parity bit. The receiving control unit sends the "received correct" code over data bus LMI on the last two bits in the frame, and detection of this code at the sending control unit terminates the interchange.

SECURITY

Message parity: in the event of an (odd) parity error the control unit does not send the "received correct" code to the sending control unit, "not received correct" flip-flop 67 (FIG. 4) indicating the need to repeat the interchange procedure in its entirety, beginning with the call procedure.

Duplication of data and signal links: the switchover between links a and b in receive mode is under the control of monitoring unit OC or under the control of the control unit, in response to interchange errors.

Comparison of signal links LSMa and LMSb in receive mode: this comparison shows up incorrect transmission on one of the two links.

Send/receive comparison on signal link: the comparison is executed in the send transmission interval allocated to the control unit, to compare the information sent and the information received over signal link LMSa or LMSb.

Examples of interchanges between two control units will now be described. In all these examples it is assumed that marker MQ2 is the calling unit and multiregister MR1 is the called unit.

Transmission of message from marker MQ2 to multiregister MR1

Marker MQ2 is allocated time slots t18 and t19. Multiregister MR1 is allocated time slots t8 and t9 in the same frame. The marker wishes to send a message to the multiregister.

In one frame it reads unit status memory 32 to discover the multiregister status. If the multiregister is operational call number memory 17 is loaded with the number of multiregister MR1 and the message to be sent is loaded into send memory 55.

In the next frame the marker sends the calling code (number of multiregister MR1) on the signal bus. If the multiregister connection module is on standby it recognises the calling code (comparator 36) and sends a response bit through flip-flop 38 and AND gate 39 to inhibit any other interchange on the signal bus. It activates flip-flop 46 in the multiregister to send the receive enable signal CR to authorise reception of the message which will be sent over data bus LMI in the next frame. In the marker, the response bit received from the multiregister activates flip-flop 28 which outputs the send enable signal CE2 to enable addressing of send memory 55.

In the next frame the message is sent from register 56 and the odd parity bit is sent through AND gate 62. The message is received in the multiregister's receive memory 51 through register 50. Divide by two circuit 68 computes the odd parity. The "received correct" code is sent to the marker over the data bus, through AND gate 72.

In the next frame the marker reads flip-flops 65 and 67 which are set by the "received correct" code and releases its connection module in send mode. The message is ready for processing by the multiregister.

Standby for message transmission

There are two possibilities: the multiregister is unavailable, or the signal bus is locked out by a control unit with higher priority than marker MQ2.

1/Multiregister unavailable

In one frame the marker reads unit status memory 32 to check the multiregister status. The multiregister is found to be unavailable. The marker is obliged to defer its call for as long as the unavailable state persists.

In another frame the marker finds that the multiregister is operational on consulting the unit status memory, and the send procedure is executed normally, as described in the previous example.

2/Signal bus locked out:

In one frame the marker finds that the multiregister is operational and loads cell number memory 17 and send memory 55 of its connection module. In the next frame the connection module would send the calling code through send register 19, but a control unit of higher priority than marker MQ2 has received a response to its call and the signal bus is locked out for any new request for sending a calling code by any other control unit. In particular, AND gate 21 in marker MQ2 is not enabled, flip-flop 23 having switched to the 1 state on the response by the control unit of higher priority than marker MQ2. The calling code can only be sent to multiregister MR1 if the calling unit (marker) has the higher priority, in other words when no control unit of higher priority has sent a call on the signal bus and received a response which locks out the signal bus.

Called control unit connection module not receiving

In one frame the marker finds that the multiregister is operational and loads call number memory 17 and send memory 55 of its connection module. In the next frame the connection module sends the multiregister calling code. The multiregister connection module is not on standby (standby register 40 not activated), as it is processing a message. Comparator 36 recognises the call, but the response bit is not sent and flip-flop 38 is not activated. The marker connection module repeats the call until a response is received.

Message received incorrectly

The message is sent in the first two frames as described in the first example: transmission of a message from marker MQ2 to multiregister MR1. In the next frame the message is sent by register 56 and the odd parity bit is output by AND gate 62. The multiregister receives the message and computes the odd parity (divide by two circuit 68). The result of this computation sets "end of exchange in receive mode" flip-flop 69 to 0 and "receive parity error" flip-flop 71 to 1. An error has occurred during message transmission and the multiregister connection module does not send the "received correct" code over the signal bus at t31.05 (AND gate 72).

Non-receipt of the "received correct" bit at the marker connection module sets "end of exchange in send mode" flip-flop 65 to 0 and "not received correct" flip-flop 67 to 1.

In the next frame the marker tests flip-flops 65 and 67 over test signal bus LT. Enabling of "not received correct" flip-flop 67 conditions the transmission of a fault message to monitoring unit OC. Multiregister MR1 tests flip-flops 69 and 71 in its connection module over its test signal bus LT and sends a fault signal to the monitoring unit, setting its connection module to standby on the preceding state.

The invention is not applicable only to telephone exchanges, used as an example of a typical application. The connection modules may be used in associated with control unit other than markers, charging units, etc. without departing from the scope of the invention, which is generally applicable to systems for exchanging messages, such as are used in any system requiring the exchange of data between its various stations. Such systems are commonly found in telecommunications and computer systems.

We claim:

1. A system for exchanging encoded messages between stations connected by a signal bus and a data bus, each station being connected to a general timebase and including a connection module connected to the data bus and to the signal bus; wherein the signal bus and data bus are serial multiplex links synchronous with the timebase, a time interval comprising consecutive even-numbered and odd-numbered time slots is allocated in each signalling frame to each connection module, and wherein each connection module comprises:
   means for calling a station by sending a number relating to the called station in the time interval of said connection module,
   means for receiving a response from the called station during said time interval of said connection module and authorizing the sending of a data message,
   means for sending a response upon receipt of a number sent from a calling station in said time interval of said connection module,
   means for storing a data message and sending said message in a data bus frame,
   means for receiving a data message and means for storing the message,
   means for computing the parity of the sent message and sending a parity bit at the end of the message, and
   means for computing the parity of the received data message and sending the result of the computation in the data frame following the message.

2. A system according to claim 1, wherein the parity calculations and the parity bits are based on maintaining odd parity.

3. A system according to claim 1, wherein the connection module further comprises:
   means for sending its status in its time interval, and
   means for receiving and storing the status of each other station.

4. A system according to claim 1, wherein the numbers of the time slots in a time interval in the signalling frame are higher for lower station priorities and the connecting module further comprises means for receiving a response from a higher priority station in its time interval and disabling transmission of a data message.

5. A system according to claim 1, wherein the connection module further comprises means for storing the number of a called station and means for sending said numbers in the even-numbered time slot of the time interval allocated to the connection module.

6. A system according to claim 5, wherein the means for storing the number of a called station also stores a bit indicating the reason for which the station is called, said bit being transmitted, with the number of the called station, by the means for calling a station.

7. A system according to claim 3, wherein the means for sending the status of the connection module further comprises means for sending said status in the odd-numbered time slot of the time interval allocated to the connection mode.

8. A system according to claim 5, wherein the means for sending the status of the connection module also stores an exclusivity bit allowing the station connected to the module to check the exclusivity of a task, said exclusivity bit being transmitted with the status of the connection module.

9. A system according to claim 1, wherein the signal bus and data bus are duplicated, a signalling message being sent on both signal buses and received on one signal bus and a data message being sent on both data buses and received on one data bus, switchover between receiving buses being commanded by the receiving station in response to receipt of a message including a parity error.

* * * * *